(12) United States Patent
Dey et al.

(10) Patent No.: US 6,696,117 B2
(45) Date of Patent: Feb. 24, 2004

(54) COMPOSITE LAMINATE STRUCTURES ESPECIALLY USEFUL FOR AUTOMOTIVE TRIM COMPONENTS, AND METHODS AND TIE LAYERS EMPLOYED TO MAKE THE SAME

(75) Inventors: Subir K. Dey, Bridgewater, NJ (US); Subhash H. Patel, Piscataway, NJ (US); Marino Xanthos, Fort Lee, NJ (US)

(73) Assignee: Guardian Industries, Inc., Auburn Hills, MI (US)

( * ) Notice: Subject to any disclaimer, the term of this patent is extended or adjusted under 35 U.S.C. 154(b) by 94 days.

(21) Appl. No.: 09/993,900

(22) Filed: Nov. 27, 2001

(65) Prior Publication Data

US 2003/0099840 A1 May 29, 2003

(51) Int. Cl.[7] ............... B32B 27/08; B32B 27/30; B32B 27/32; B60R 13/02
(52) U.S. Cl. ............ 428/31; 428/421; 428/520; 428/522; 428/523
(58) Field of Search ............ 428/31, 421, 520, 428/522, 523, 422

(56) References Cited

U.S. PATENT DOCUMENTS 6,187,233 B1    2/2001  Smith ............... 264/75

2001/0008687 A1 *  7/2001  Kollaja et al. ............ 428/220
2002/0009598 A1    1/2002  LaFave et al. ............ 428/421

FOREIGN PATENT DOCUMENTS

| EP | 0 864 417 A3 | 9/1998 |
| EP | 0 864 417 A2 | 9/1998 |
| EP | 0 911 148 A2 | 4/1999 |
| WO | WO 01/28769 A1 | 4/2001 |

OTHER PUBLICATIONS

MatWeb.com Material Property Data Sheet, EVAL EP–F104BW, Jan. 1996.*

MatWeb.com Material PRoperty Data Sheet, EVAL LC–E105A, Jan. 1996.*

* cited by examiner

Primary Examiner—Ramsey Zacharia
(74) Attorney, Agent, or Firm—Nixon & Vanderhye P.C.

(57) ABSTRACT

Laminates include a thermoplastic substrate layer, a clear coat layer, and a tie layer. The tie layer most preferably includes an adhesive-enhancing effective amount of a thermoplastic reactive terpolymer of ethylene-methyl acrylate-glycidyl methacrylate (E-MA-GMA) which adhesively bonds the substrate and clear coat layers one to another. Most preferably, the tie layer is a blend of E-MA-GMA and a tackifier (e.g., a C6–C8 cycloaliphatic hydrocarbon resin). The laminate may be employed to manufacture a variety of shaped articles, most preferably automotive trim components.

37 Claims, 1 Drawing Sheet

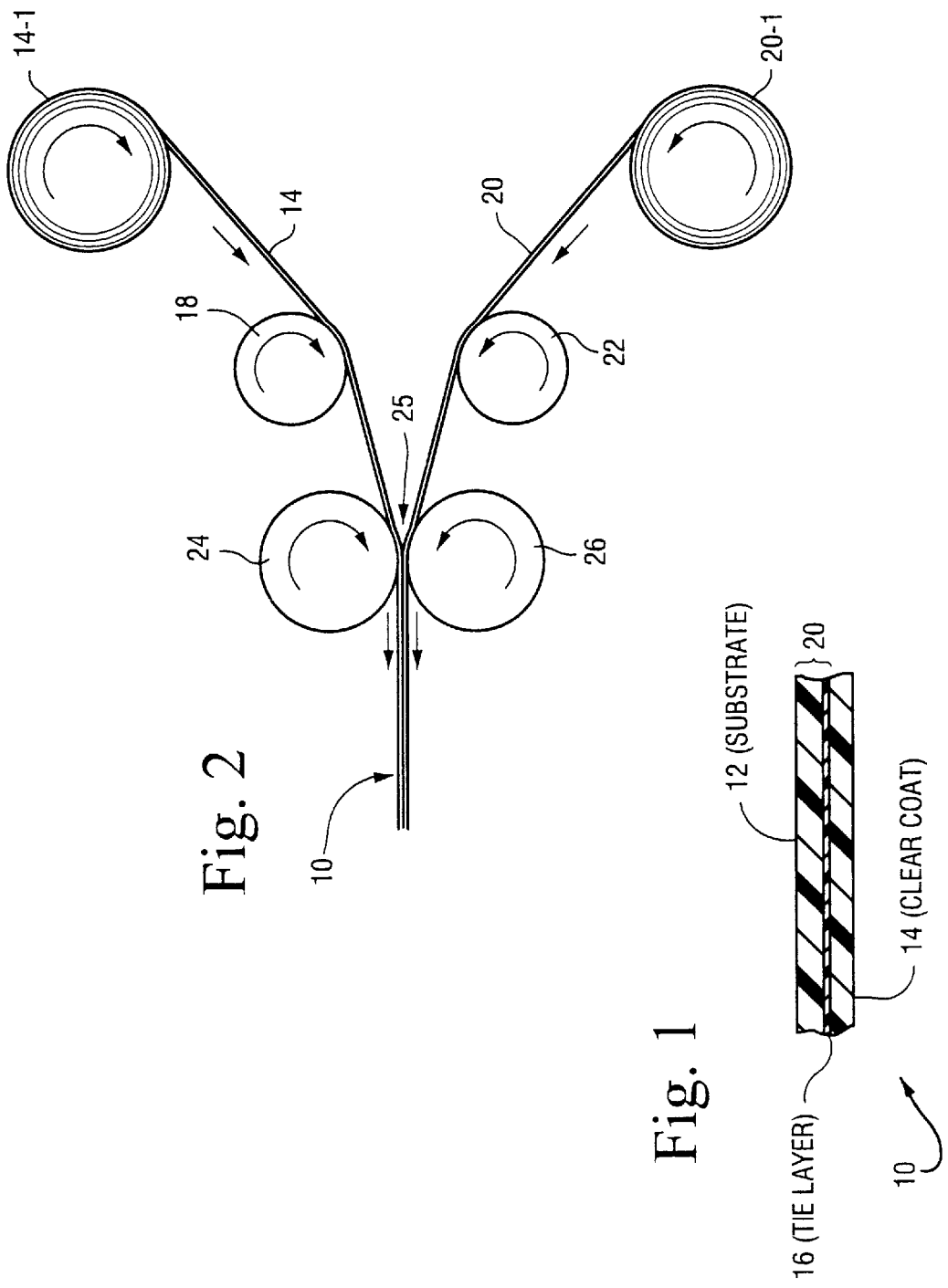

COMPOSITE LAMINATE STRUCTURES ESPECIALLY USEFUL FOR AUTOMOTIVE TRIM COMPONENTS, AND METHODS AND TIE LAYERS EMPLOYED TO MAKE THE SAME

FIELD OF THE INVENTION

The present invention related generally to tie layers that may be employed to adhesively bond plastic film layers and/or sheets one to another to form composite laminate structures. More specifically, the present invention relates to composite laminate structures that are particularly usefully employed in the manufacture of automotive components (especially exterior automotive trim components).

BACKGROUND AND SUMMARY OF THE INVENTION

It is notoriously well known to apply automotive trim components made of plastics material to the exterior of automotive vehicles, such as cars, trucks, vans and the like. Examples of such trim components include accent stripes, side door bumper elements, claddings, wheel covers, grills, and bumper fascia. Moreover, other automotive components that are made from plastics, such as automotive body panels (e.g., door side panels) and the like are known.

Problems have been encountered in the past when the color of automotive components formed from plastics materials is attempted to be matched or coordinated with the overall body color. For example, such components have typically been painted with a final "clear coat" being applied for purpose of protecting the underlying colored or pigmented paint coat.

It has recently been proposed in U.S. Pat. No. 6,187,233 B1 issued on Feb. 13, 2001 (the entire content of which is expressly incorporated hereinto by reference), to provide a color pigmented thermoplastic layer which is calendered into a laminate structure with a transparent clear coat layer. The laminate is then subsequently vacuum-formed into a three dimensional shaped structure approximating the final shape of the final automotive component. In especially preferred embodiments, the color pigmented layer is a thermoplastic polyolefin (TPO), while the clear coat layer is a fluorinated thermoplastic material, such as polyvinyl fluoride (PVF).

While the techniques described in the above-noted U.S. '233 patent are satisfactory, certain improvements therein are still desirable. For example, it would be highly desirable if the bonding strength between the color pigmented and clear coat layers could be enhanced. It is towards providing such improvements that the present invention is directed.

Broadly, the present invention is embodied in laminates which include a thermoplastic substrate layer, a clear coat layer, and a tie layer. The tie layer most preferably includes an adhesive-enhancing effective amount of a thermoplastic reactive terpolymer of ethylene-methyl acrylate-glycidyl methacrylate (E-MA-GMA) which adhesively bonds the substrate and clear coat layers one to another. Most preferably, the tie layer is a blend of E-MA-GMA and a tackifier (e.g., a C6–C8 cycloaliphatic hydrocarbon resin). The laminate may be employed to manufacture a variety of shaped articles, most preferably automotive trim components.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 1 is an enlarged cross-sectional view of a laminate sheet in accordance with the present invention; and FIG. 2 is a schematic diagram of a system that may be employed to laminate a clear coat layer to a substrate.

DETAILED DESCRIPTION OF THE INVENTION

As shown in accompanying FIG. 1, the laminate 10 in accordance with the present invention most preferably includes a thermoplastic substrate layer 12, a clear coat layer 14, and a tie layer 16 which adhesively laminates the substrate and clear coat layers 12, 14 one to the other. The laminate 10 is most preferably provided in sheet form of any desired width and may be employed in injection-molding and thermoforming operations (e.g., as disclosed in the above-cited U.S. '233 patent) so as to form a variety of composite components, such as automotive trim components. Most preferably, the substrate layer 12 is colored with a colorant (pigment) blended homogeneously therewith.

The substrate layer 12 may be formed from virtually any thermoplastic material that is capable of subsequent thermoforming (e.g., so as to allow thermoformed contours and shapes to be formed in the manufacture of automotive trim components). In especially preferred forms, the substrate layer is formed of a thermoplastic polyolefin (TPO). A variety of TPO materials are commercially available, such as E-3000 grade TPO available commercially from Solvay Engineered Polymers and PD 801 grade TPO available commercially from Equistar Chemicals, LP. The TPO may be "neat" (that is, provided without any additives therein) or, more preferably, may be blended with virtually any additive conventionally employed in engineered resins generally. Thus, the TPO materials that may be employed satisfactorily in the practice of the present invention may include one or more colorants, ultraviolet stabilizers, fillers, processing aids and the like as may be desired or necessary for particular end-use applications.

The clear coat layer 14 is transparent or at least substantially transparent to visible light. Thus, for example, the clear coat layer is most preferably at least 90% transparent to visible light, and typically at least 95% transparent to visible light. Thus, the purpose of the clear coat layer 14 is to provide a high gloss finish to the products made from the laminate 10 and to protect the substrate layer 12 (e.g., so as to provide a layer which is resistant to scratching, UV radiation, abrasions, marring, heat and weathering). Most preferably, the clear coat layer includes a fluorinated thermoplastic (e.g., a polyvinyl fluoride, PVF). One particularly preferred PVF that may be employed as a clear coat layer 14 in the laminates 10 of the present invention is TEDLAR® polyvinyl fluoride commercially available from E. I. duPont de Nemours, Inc. ("duPont") of Wilmington, Del. Most preferably, the clear coat layer employed in the present invention is the duPont TEDLAR® TTR 10 AH8 and TEDLAR® TTR 10 AM8 polyvinyl fluoride.

The thickness of the clear coat layer will typically be between about 0.1 mil to about 4.0 mils, and typically between about 0.5 mil to about 1.5 mils. An especially preferred thickness of the clear coat layer is about 1.0 mil.

In this regard, it will be understood that the thickness of the clear coat layer 14 expressed immediately above is in the absence of any protective layer that may be provided by the supplier as a means to protect the clear coat during processing and/or to assist the lamination of the clear coat layer to the substrate layer 12.

When employing PVF as the clear coat layer, it is advantageous that a surface thereof be primed with a layer of a suitable adhesion promoting agent. For example, when PVF is employed as a clear coat material in accordance with the present invention, it is preferred that one surface layer of the PVF film be primed with a layer of an acrylic polymer functioning as the adhesion promoting agent.

The adhesive bond between the base and clear coat layers 12, 14, respectively, is enhanced by virtue of the tie layer 16. In this regard, the tie layer in accordance with the present invention most preferably includes an adhesive-enhancing effective amount of a thermoplastic reactive terpolymer of ethylene-methyl acrylate-glycidyl methacrylate (E-MA-GMA) having epoxide functionality. The preferred E-MA-GMA tie layer material will have between about 15 to about 35 wt. % of methyl acrylate content, and typically between about 20 to about 30 wt. % methyl acrylate. Most preferably, the E-MA-GMA tie layer material will have about 25 wt. % methyl acrylate content. The preferred E-MA-GMA tie layer will also have between about 5 to about 15 wt. % glycidyl methacrylate content, and typically between about 5 to about 10 wt. % glycidyl methacrylate content. Advantageously, the preferred E-MA-GMA tie layer will have about 8 wt. % glycidyl methacrylate content.

The preferred E-MA-GMA tie layer material is commercially available from Atofina Chemicals, Inc. as LOTADER® AX8900. Such material will have about 25 wt. % methyl acrylate content and about 8 wt. % glycidyl methacrylate content and will typically exhibit a melt index at 190° C., 2.16 kg of about 6 g/10 minutes according to ASTM D 1238; a melting point (DSC) of 60–65° C.; a tensile strength and elongation at break of 810 psi and 900–1100%, respectively, according to ASTM D 638 and a Hardness A of 70 according to ASTM D 2240.

Most preferably, the tie layer is a homogenous blend of E-MA-GMA and a tackifier. When employed as a tie layer to adhesively bond TPO and PVF layers one to another, it has been found that a blend of E-MA-GMA and a C6–C8 cycloaliphatic resin produces especially advantageous adhesive properties. Preferably, the weight ratio of E-MA-GMA to tackifier employed in the tie layer 16 in accordance with the present invention is between about 100:0 to about 25:75, more preferably between about 90:10 to about 25:75. Most preferably, the weight ratio of E-MA-GMA to tackifier is about 50:50.

Because the tie layer is interposed physically between the substrate layer 12, and the clear coat layer 14, it likewise will most preferably be substantially transparent to visible light. Thus, for example, the tie layer 16 will most preferably exhibit a transparency to visible light of at least about 75% or greater. In especially preferred embodiments of the invention, the tie layer 16 will be at least about 90% transparent to visible light. In addition, the tie layer 16 will be relatively thin as compared to the thickness of the substrate and/or clear coat layers 12, 14, respectively. In preferred embodiments, the thickness of the tie layer will be about 7.5 mils or less, more preferably about 5 mils or less, and most preferably about 3 mils or less.

A preformed multilayer sheet of the substrate layer 12 and the tie layer 16 may be provided by co-extruding the substrate layer material and the tie layer material through a sheet die of desired width according to well known coextrusion techniques. The coextruded substrate and tie layers 12, 16 may then be allowed to cool and taken up in roll form for subsequent lamination with the clear coat layer 14 which is itself most preferably provided in roll form. Alternatively, the coextruded substrate and tie layers 12, 16 may be cooled in line and laminated continuously with a clear coat layer.

Accompanying FIG. 2 depicts one exemplary technique for forming the laminate 10 in accordance with the present invention. In this regard, clear coat layer 14 may be unwound from its supply roll 14-1 and passed over guide roller 18. The coextruded substrate and tie layers 12, 16 (designated collectively as reference numeral 20 in FIG. 2, and see also the collective reference thereto in FIG. 1) may be unwound from its supply roll 20-1 and passed over guide roll 22 so that the tie layer 16 thereof is disposed physically between the substrate and clear coat layers 12, 14, respectively. The layers 14, 20 meet at the nip 25 between the opposed pair of laminating rolls 24, 26. The surfaces of the rolls 24, 26 may optionally be heated in any convenient manner. Most preferably, the surfaces of the rolls 24, 26 are heated to elevated temperatures of between about 220° F. to about 275° F. Moreover, the rolls 24, 26 are capable of exerting a force at the nip of between about 20 to about 350 pli (pounds per linear inch), more preferably between about 100 to about 300 pli, and most preferably about 120 pli. The elevated temperature and laminating force at the nip between the rolls 24, 26 thereby cause the substrate layer 12 to be bonded to the clear coat layer 14 via the tie layer 16 so as to form the laminate 10 which is fed away from the rolls 24, 26 and most preferably taken up in roll form.

Although it is presently preferred to coextrude melt flows of the respective materials to form the substrate layer 12 and the tie layer 16, it is also contemplated that the substrate layer 12 may be provided as a preformed sheet, in which case a melt of the tie layer 16 may be extruded onto the preformed substrate layer sheet to the desired thickness. Also, the tie layer 16 may be provided on the clear coat layer 14 which is thereafter brought into laminating contact with the substrate layer 12. It is also contemplated that the tie layer material may be extruded as a melt between preformed sheets of the substrate and clear coat layers 12, 14 just upstream of the nip between the rolls 24, 26 (i.e., if the laminate is produced in a continuous process) or just prior to lamination of individual sheets of layers 12, 14 if done in a batch-wise manner.

The present invention will be further understood by reference to the following non-limiting Examples.

EXAMPLES

Example 1

The following components were employed:

Thermoplastic Polyolefin (TPO): E-3000 commercially available from Solvay Engineered Polymers of Auburn Hills, Mich.

Polyvinyl Fluoride (PVF): TEDLAR® TR 10 AH8 or TR10AM8 clear coat sheet commercially available from E. I. duPont de Nemours Inc. of Wilmington, Del.

ESCOREZ™ 5340: A water white C6–C8 cycloaliphatic hydrocarbon tackifier resin commercially available from Exxon Mobil Chemical Company having a number average molecular weight (MW) of about 380 g/mol, a glass transition temperature ($T_g$) of about 90° C., and a melt viscosity at 180° C. of about 4000 mPa·s.

LOTADER® AX8900: A reactive terpolymer of ethylene-methyl acrylate-glycidyl methacrylate having epoxide functionality commercially available from Atofina Chemicals, Inc. having a methyl acrylate content (ATO method) of about 25 wt. % and a glycidyl methacrylate content (ATO method) of about 8 wt. % and exhibiting the following physical properties: melt index at 190° C., 2.16 kg of about 6 g/10 minutes according to ASTM D 1238; melting point (DSC) of 60–65° C.; tensile strength and elongation at break of 810 psi and 900–1100%, respectively, according to ASTM D 638 and a Hardness A of 70 according to ASTM D 2240.

LOTADER® AX8840: A non-methyl acrylate containing reactive copolymer of ethylene and glycidyl methacrylate having epoxide functionality commercially available from Atofina Chemicals, Inc. having a glycidyl methacrylate content (ATO method) of about 8 wt. % and exhibiting the following physical properties: melt index at 190° C., 2.16 kg of about 5 g/10 minutes according to ASTM D 1238; melting point (DSC) of 109° C.; tensile strength and elongation at break of 1160 psi and 420%, respectively, according to ASTM D 638 and a Hardness A of 92 according to ASTM D 2240.

LOTADER® 8200: A reactive terpolymer of ethylene-ethyl acrylate-maleic anhydride commercially available from Atofina Chemicals, Inc. having an ethyl acrylate content of about 6.5 wt. % and a maleic anhydride content of about 2.85 wt. %, and exhibiting the following physical properties: melt index of about 200 g/10 minutes according to ASTM D 1238; melting point (DSC) of 100° C.; and tensile strength and elongation at break of 8 MPa and 400%, respectively, according to ASTM D 638.

LOTRYL® 28MA07: A copolymer of ethylene and methyl acrylate (EMA) commercially available from Atofina Chemicals, Inc. having an ester content of between about 26–30 wt. % and exhibiting the following physical properties: melt index of about 7 g/10 minutes according to ASTM D 1238; melting point (DSC) of 65° C.; and a Vicat Point of less than 40° C. according to ASTM D 1525.

TPO was coextruded with a tie layer material as noted in Table 1 below so as to form a multilayer sheet using a 1-inch diameter single screw extruder for the TPO and a ¾-inch diameter extruder for the tie layer materials. A sheet die 10-inches wide was employed with an opening of 40 mil to cast the extrudate on a 3 stack roll. The multilayer sheet was 38 mil thick with the TPO layer comprising 35 mil thickness. The multilayer TPO/tie layer sheet was thereafter laminated to a clear coat sheet of polyvinyl fluoride (TEDLAR® PVF) to form a laminate comprised of TPO/tie layer/PVF by concurrently feeding the sheets to the nip region of a lamination roll.

The resulting laminated sheet was tested at room temperature (70° F.) for peel strength of the PVF layer using a universal testing machine in accordance with ASTM D 1876-95. The results are listed below in Table 1.

TABLE 1

| Tie Layer Material | Peel Strength (KN/m) |
|---|---|
| LOTADER ® AX8900 | 0.75 |
| LOTADER ® AX8840 | 0 |

TABLE 1-continued

| Tie Layer Material | Peel Strength (KN/m) |
|---|---|
| LOTADER ® AX8200 | 0 |
| LOTRYL ® 28MA07 | 0 |

Example 2

Example 1 was repeated using a multilayer coextrudate of TPO and a blend of LOTADER® AX8900 with ESCOREZ™ 5340. Specifically, a 50/50 dry blend of LOTADER® AX8900 and ESCOREZ™ 5340 was fed into the hopper of a ¾-inch diameter, 24 L/D long single screw extruder equipped with a static mixer at the end of the barrel. The TPO (E-3000, Solvay Engineered Polymers) was fed into the hopper of a separate 1-inch diameter, 24 L/D long single screw extruder. Both melts were coextruded through a 10-inch wide sheet die with 40 mil opening such that the blended tie layer material of LOTADER® AX8900 and ESCOREZ™ 5340 constituted about 4 mil thickness of the resulting coextrudate. That portion of the die lip in contact with the TPO was maintained at 200° C., while that portion of the die lip in contact with the blended tie layer material was maintained at 150° C. Uniform distribution of the blended tie layer material was obtained. The sheet coextrudate was cooled using a three roll stack and was used for laminating a PVF clear coat (TEDLAR®) by means of a compression mold.

Subsequent tests showed a marked improvement in peel strength of 2.0 KN/m.

Example 3

Example 2 was repeated using blend ratios of LOTADER® AX8900 to ESCOREZ™ 5340 from 75:25 to 25:75 and tie layer thickness varying between about 1.5 mil to about 4.0 mil (corresponding to application levels of between about 1.14 oz/ft$^2$ to about 2.8 oz/ft$^2$). A scriber was used to scribe lines 3 mm apart at right angles and diagonally in one direction through the clear coat PVF layer. A 25 mm wide adhesive tape (3M #898) was firmly pressed onto the scribed PVF layer and removed briskly after 90 seconds (+/−30 seconds) by pulling the tape onto itself at an angle relative to the test laminate of as close to 180° as possible. The resulting test laminate was graded visually according to the following scale to determine the amount of flaking or chipping of the scored PVF layer that occurred: Grade 0=0% removed; Grade 1=less than 5% removed; Grade 2=approximately 5% removed; Grade 3=approximately 10% removed; Grade 4=approximately 15% removed; Grade 5=approximately 20% removed; Grade 6=approximately 25% removed; Grade 7=approximately 45% removed; Grade 8=approximately 60% removed; Grade 9=approximately 75% removed; and Grade 10=approximately 95% removed. Advantageous delamination corresponding to Grade 6 and below of the PVF layer was observed.

Example 4 (Comparative)

Example 1 was repeated except that no tie layer was interposed between the TPO and PVF layers. No adhesion between the TPO and PVF layers was observed as the layers were easily delaminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A laminate comprised of a thermoplastic substrate layer, a clear coat layer comprised of a fluorinated thermoplastic, and a tie layer comprised of an adhesive-enhancing effective amount of a thermoplastic reactive terpolymer of ethylene-methyl acrylate-glycidyl methacrylate (E-MA-GMA) which adhesively bonds said substrate and clear coat layers one to another.

2. The laminate of claim 1, wherein said E-MA-GMA terpolymer has a methyl acrylate content of between about 15 to about 35 wt. %.

3. The laminate of claim 1, wherein the E-MA-GMA terpolymer has a methyl acrylate content of between about 20 to about 30 wt. %.

4. The laminate of claim 1, wherein the E-MA-GMA terpolymer has a glycidyl methacrylate content of between about 5 to about 15 wt. %.

5. The laminate of claim 1, wherein the E-MA-GMA terpolymer has a glycidyl methacrylate content of between about 5 to about 10 wt. %.

6. The laminate of claim 1, wherein the E-MA-GMA terpolymer has a methyl acrylate content of about 25 wt. %.

7. The laminate of claim 6, wherein the E-MA-GMA terpolymer has a glycidyl methacrylate content of about 8 wt. %.

8. The laminate of claim 1, wherein the E-MA-GMA terpolymer has a glycidyl methacrylate content of about 8 wt. %.

9. The laminate of claim 1, wherein the substrate layer is comprised of a thermoplastic polyolefin (TPO).

10. The laminate of claim 1 or 9, wherein the clear coat layer is comprised of a polyvinyl fluoride (PVF).

11. A shaped article which includes a laminate according to any one of claims 1–8.

12. The shaped article of claim 11, in the form of an automotive trim component.

13. Automotive trim which comprises as a visible component a laminate comprised of a thermoplastic substrate layer, a clear coat layer comprised of a fluorinated thermoplastic, and a tie layer comprised of an adhesive-enhancing effective amount of a thermoplastic reactive terpolymer of ethylene-methyl acrylate-glycidyl methacrylate (E-MA-GMA) which adhesively bonds said substrate and clear coat layers one to another.

14. The automotive trim of claim 13, wherein the substrate layer includes an amount of a colorant so as to impart a predetermined color to the laminate.

15. The automotive trim of claim 14, wherein said clear coat layer is at least 90% transparent to visible light.

16. The automotive trim of claim 13 or 14, wherein said tie layer is at least 75% transparent to visible light.

17. The automotive trim of claim 13, wherein the tie layer comprises a blend of E-MA-GMA and a C6–C8 cycloaliphatic hydrocarbon tackifier resin.

18. The automotive trim of claim 17, wherein the weight ratio of E-MA-GMA to tackifier resin is between about 90:10 to about 25:75.

19. The automotive trim of claim 17, wherein the weight ratio of E-MA-GMA to tackifier resin is about 50:50.

20. The automotive trim of claim 19, wherein the substrate layer is comprised of a thermoplastic polyolefin (TPO), and said clear coat layer is comprised of a polyvinyl fluoride (PVF).

21. The automotive trim of claim 13, wherein the substrate layer is comprised of a thermoplastic polyolefin (TPO).

22. The automotive trim of claim 13, 17 or 21, wherein the clear coat layer is comprised of a polyvinyl fluoride (PVF).

23. A laminate comprised of a thermoplastic substrate layer, a clear coat layer, and a tie layer comprised of an adhesive-enhancing effective amount of a blend of a thermoplastic reactive terpolymer of ethylene-methyl acrylate-glycidyl methacrylate (E-MA-GMA) and a C6–C8 cycloaliphatic hydrocarbon tackifier resin, wherein said terpolymer adhesively bonds said substrate and clear coat layers one to another.

24. The laminate of claim 23, wherein said E-MA-GMA terpolymer has a methyl acrylate content of between about 15 to about 35 wt. %.

25. The laminate of claim 23, wherein the E-MA-GMA terpolymer has a methyl acrylate content of between about 20 to about 30 wt. %.

26. The laminate of claim 23, wherein the E-MA-GMA terpolymer has a glycidyl methacrylate content of between about 5 to about 15 wt. %.

27. The laminate of claim 23, wherein the E-MA-GMA terpolymer has a glycidyl methacrylate content of between about 5 to about 10 wt. %.

28. The laminate of claim 23, wherein the E-MA-GMA terpolymer has a methyl acrylate content of about 25 wt. %.

29. The laminate of claim 28, wherein the E-MA-GMA terpolymer has a glycidyl methacrylate content of about 8 wt. %.

30. The laminate of claim 23, wherein the E-MA-GMA terpolymer has a glycidyl methacrylate content of about 8 wt. %.

31. The laminate of claim 23, wherein the weight ratio of E-MA-GMA to tackifier resin is between about 90:10 to about 25:75.

32. The laminate of claim 23, wherein the weight ratio of E-MA-GMA to tackifier resin is about 50:50.

33. The laminate of claim 23 wherein the clear coat layer is comprised of a fluorinated thermoplastic.

34. The laminate of claim 33, wherein said fluorinated thermoplastic is a polyvinyl fluoride (PVF).

35. The laminate of claim 34, wherein the substrate layer is comprised of a thermoplastic polyolefin (TPO).

36. A shaped article which includes a laminate of any one of claims 23–35.

37. A shaped article as in claim 36 in the form of an automotive trim component.

* * * * *